May 10, 1960 R. D. HEIDENREICH 2,935,781
MANUFACTURE OF GERMANIUM TRANSLATORS
Filed Dec. 1, 1955
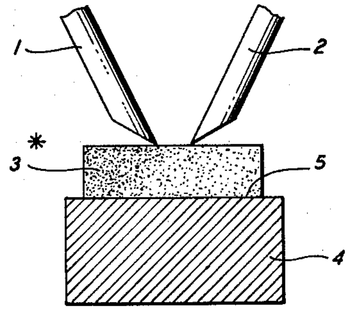
*GERMANIUM BODY WITH SURFACE PARTIALLY COATED BY OXIDE FILM PRODUCED BY TREATMENT WITH HF-$H_2O_2$ SOLUTION
INVENTOR
R. D. HEIDENREICH
BY Edwin B. Cave
ATTORNEY United States Patent Office 2,935,781

Patented May 10, 1960

2,935,781

MANUFACTURE OF GERMANIUM TRANSLATORS

Robert D. Heidenreich, Madison, N.J., assignor to Bell Telephone Laboratories, Incorporated, New York, N.Y., a corporation of New York Application December 1, 1955, Serial No. 550,511

4 Claims. (Cl. 29—25.3)

This invention relates to a method of forming protective coatings on germanium, and to germanium bodies so coated.

The invention is particularly applicable to germanium bodies used in semiconductor translator devices. In the manufacture of semiconductor translator devices, such as diodes and transistors, there is considerable opportunity for contamination of the germanium being treated, either from handling or from atmospheric impurities. The manufacture of point-contact translators, for example, customarily involves mounting cut discs or wafers of germanium on a brass stud, usually by soldering, to provide a broad-area contact to the germanium. The wafer is then ground and etched, washed, and one or more point-contact electrodes are affixed thereto to give the completed assembly. As even small quantities of foreign materials, picked up by the germanium during these operations, may seriously affect the conductivity properties of the semiconductor, it is desirable that it be protected from possible deleterious contamination during processing. Similar protection from undesirable contamination is also of value in the processing of junction devices.

The figure of the drawing illustrates a semiconductor device produced by the method of this invention.

The method of the invention described herein contemplates the formation of a protective glassy coating on the surface of the germanium during the manufacturing process. The coating is produced by the action of a novel composition containing hydrogen fluoride and hydrogen peroxide with water. The films formed on germanium by this solution are removable, and may be removed after danger of contamination is reduced. The films may also be kept on the surface of the germanium as a protective coating during and after the assembly of the translating device.

The film-forming reagent is an aqueous solution of hydrogen fluoride and hydrogen peroxide in which the ratio, by weight, of hydrogen fluoride to hydrogen peroxide lies between the values 4:1 and 20:1. The total concentration of hydrogen fluoride in the solution is preferably kept at concentrations between about 50 grams per liter of solution and about 325 grams per liter of solution. Particularly good results are obtained when the value of the ratio of hydrogen fluoride to hydrogen peroxide in the solution is kept within the limits 5:1 to 12:1.

As the ratio of the concentration of hydrogen fluoride to the concentration of hydrogen peroxide in solutions of this nature increases, up to a point, the rate of film formation on a germanium surface increases. If the ratio of hydrogen fluoride to hydrogen peroxide much exceeds the value of 20:1, the film-forming activity of the mixtures falls off to rates too slow for practical use. As the mentioned ratio decreases below the value 4:1, the solutions approach the composition of surface etchants known in the art. Film formation ceases, and an etching attack of the germanium is initiated. Particularly good control over the film-forming process can be exercised when a hydrogen fluoride-hydrogen peroxide mixture containing approximately 140 grams of hydrogen fluoride per liter is used. The acid to peroxide ratio in this preferred composition is 6.5:1.

In general, it is most convenient to mix the film-forming reagents here described from a 3 percent solution of hydrogen peroxide and a 48 percent solution of hydrogen fluoride. These solutions are readily available commercially. Other sources may be employed however, as only the composition of the mixed solution is critical to the formation of the desired films.

The mixture of hydrogen fluoride and hydrogen peroxide described as suitable for forming protective coatings on germanium are not to be confused with etchants, known in the prior art, which contain the same ingredients in other proportions. Such etchants, for example those disclosed in Patent No. 2,542,727 issued February 20, 1951, to Henry C. Theuerer, contain much smaller ratios of hydrogen fluoride to hydrogen peroxide. The etchants are intended to attack the germanium surface chemically, with removal of surface films and surface layers, to present a clean polished surface with a metallic luster. The solutions comprehended by the present invention are intended, on the contrary, to form a protective coating over the germanium surface, without etching action.

This coating, which is coherent with no visible pores or holes, has been determined by electron diffraction and electron microscopy to be an amorphous glassy hydrated oxide of germanium. The film is only slowly soluble in cold water, but can be dissolved in hot water or in dilute solutions of acid or alkali.

The thickness of the coating is variable with the time for which immersion in the acid-peroxide reagent has been maintained. A visible film, colored by interference fringes, can be produced by immersion in the reagent for less than 30 seconds. As the treatment is continued for longer periods, films of increasing thickness, exhibiting a sequence of interference colors, can be produced. For most protective purposes, immersion or an interval between about 10 seconds to 120 seconds is adequate, producing films with an estimated thickness of between 200 Angstrom units and 5000 Angstrom units.

Because of rapid loss of hydrogen peroxide from the solutions at elevated temperatures, coating with the mixtures here described is usually conveniently carried out at room temperature. Though the solutions may be cooled below room temperature before use, no additional advantage is thereby obtained. Almost complete loss of hydrogen peroxide would occur if temperatures higher than 50° C. were to be used.

One manner in which the formation of protective films on germanium may be integrated into a process of manufacturing semiconductor translator devices of the point-contact type is here outlined.

A wafer of n-type or p-type germanium, of the desired diameter, is cut and ground to the thickness desired. Grinding is usually done against a smooth, hard surface, such as of glass, using a finely ground abrasive, on the order of 600 mesh, moistened with water. The abrasive material is, conveniently, alundum, ground crystalline aluminum oxide.

After a smooth surface, free of pits, cracks, and ridges is obtained by grinding, the water is further polished chemically. Using an etchant, similar to those described in the aforementioned Patent No. 2,542,727, the dull matte surface of the germanium is brightened. Such a chemical etch has proved desirable to give the best electrical characteristics to the semiconductor. Upon removal from the etch bath, the wafer is thoroughly rinsed with methyl alcohol, and one side of the wafer filmed over using the film-forming reagent herein described. After a second thorough rinsing in methyl alcohol, the unprotected, uncoated face of the wafer is sandblasted. The sandblasted surface is copper-plated, and then soldered directly to a brass mounting slab. If more convenient procedurally, the entire wafer may be coated, after etching, with a protective film. The film is then removed from that portion of the wafer which is to be plated and soldered to the mounting slab. The removal may be made either chemically, or by sandblasting alone. In either case, after mounting, the coated, protected face of the germanium wafer is the only portion of the wafer exposed to possible contaminating influences.

Finally the mounted and coated wafer may be sawed into the small blocks which will serve as the semiconductor unit in a transistor or diode assembly. Sawing is done through the complete mounted wafer, so that each germanium block that is cut is already mounted on a brass base. The cutting, advantageously done with a gang saw, is done in high purity water. The cut units are also briefly rinsed with water.

After the protected wafer has been diced, the protective coating may be removed, for example by rinsing in dilute sodium hydroxide. However, the protective coating may be retained on the wafer during the application of point-contact electrodes and the forming of the semiconductor.

Transistor forming in the case of point-contact electrodes may be accomplished by the methods disclosed in Patent No. 2,577,803 granted December 11, 1951 to W. G. Pfann, or by the methods taught in Patent No. 2,663,829, issued to W. H. Brattain on December 22, 1953.

In the methods there disclosed, an alternating voltage is applied, through a resistor, between one rectifying contact of the transistor and the base contact of the transistor. A relatively low voltage applied between the second rectifying contact and the base contact controls the effect of the pulsating voltage on the electrical characteristics of the semiconductor. Such forming techniques bring about substantial power gains in the amplification realizable with the point-contact transistor.

As taught in the W. G. Pfann patent, No. 2,577,803, the treatment given to the germanium before forming comprises grinding or polishing by mechanical means, with a subsequent etch to improve sensitivity. In the new method described herein, the etch of the prior art is followed by a coating step which affords protection to the sensitive surface. The coating in no way interferes in the forming process for point-contact devices.

Diodes fashioned of semiconductor materials can also be pulsed, as is known in the art. Such diode pulsing, as in the forming of point-contact transistor devices, can be done advantageously in the presence of the protective oxide coatings which have been described. The pulsing technique for diode forming is described in the book Crystal Rectifiers, by H. C. Torrey and C. A. Whitmer, published by the McGraw Hill Book Company, Incorporated, New York, in 1948. As there described on page 371, one pulsing technique consists in applying 30 volt alternating-current pulses 0.8 second long at a frequency of 60 cycles per second to the point-contact electrodes of the diode. This technique was used sucessfully to form diodes coated by the methods of the present invention. Pulsing at slightly higher voltages, 40 volts to 45 volts, increased the reverse resistance of the coated diodes. The diodes thus formed were quite stable.

The materials and fabrication of the point-contact electrodes mentioned for use with both transistors and diodes are also discussed in the book Crystal Rectifiers, by H. C. Torrey and C. H. Whitmer, referred to above, on pages 316 to 322. For transistors, the collector point-contact is preferably fashioned from phosphor bronze, while the emitter may be made from the same materials mentioned in the reference for diode point-contacts.

What is claimed is:

1. The method of preparing a germanium body which comprises immersing said body in an aqueous solution of hydrogen fluoride and hydrogen peroxide, in which solution the ratio of hydrogen fluoride to hydrogen peroxide lies between the values 4:1 and 20:1, and in which solution the concentration of hydrogen fluoride is between about 50 grams per liter of solution and 325 grams per liter of solution, till such immersion produces an oxide film on the surface of said germanium body.

2. The method of preparing a semiconductor translator which comprises immersing a body of germanium in an aqueous solution of hydrogen fluoride and hydrogen peroxide, in which solution the ratio of hydrogen fluoride to hydrogen peroxide lies between the values 4:1 and 20:1, and in which solution the concentration of hydrogen fluoride is between about 50 grams per liter of solution and 325 grams per liter of solution, until an oxide film is formed on the surface of said germanium body, removing said oxide film from a portion of said surface, establishing a nonrectifying electrical contact to said unfilmed portion of said surface, and thereafter bringing at least one pointed contact wire into contact with said coated germanium surface and passing a forming current between said wire and said surface.

3. The method of preparing a semiconductor translator, which comprises immersing a germanium body, for a period between 10 seconds and 120 seconds, in an aqueous solution of the hydrogen fluoride and hydrogen peroxide, in which solution the ratio of hydrogen fluoride to hydrogen peroxide has the approximate value 6.5:1, and which solution contains about 140 grams of hydrogen fluoride per liter of solution, removing the oxide film consequently formed on the surface of said germanium body from a portion of said surface, establishing a nonrectifying electrical contact to that portion of said surface from which said film has been removed, and thereafter bringing at least one pointed contact wire into contact with said coated germanium surface and passing a forming current between said wire and said surface.

4. The method of protecting germanium from contamination during the fabrication of semiconductor translator devices therefrom, which method comprises forming a glassy oxide film on said germanium by immersion of said germanium in an aqueous solution of hydrogen fluoride and hydrogen peroxide, in which solution the ratio of hydrogen fluoride to hydrogen peroxide lies between the values 4:1 and 20:1 and in which solution the concentration of hydrogen fluoride is between about 50 grams per liter of solution and 325 grams per liter of solution, and removing said film after fabrication of the semiconductor translator by immersion of the coated germanium body in dilute alkaline solution.

References Cited in the file of this patent

UNITED STATES PATENTS

| | | |
|---|---|---|
| 2,577,803 | Pfann | Dec. 11, 1951 |
| 2,650,311 | Bray et al. | Aug. 25, 1953 |
| 2,673,312 | Odell | Mar. 23, 1954 |
| 2,686,279 | Barton | Aug. 10, 1954 |
| 2,695,852 | Sparks | Nov. 30, 1954 |
| 2,812,480 | Ellis | Nov. 5, 1957 |